(12) United States Patent
Korenstein

(10) Patent No.: US 10,550,041 B1
(45) Date of Patent: Feb. 4, 2020

(54) FLUORIDE-BASED NANOCOMPOSITE MATERIALS FOR INFRARED WINDOW APPLICATIONS

(71) Applicant: RAYTHEON COMPANY, Waltham, MA (US)

(72) Inventor: Ralph Korenstein, Natick, MA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 16/170,216

(22) Filed: Oct. 25, 2018

(51) Int. Cl.
*C04B 35/553* (2006.01)
*C04B 35/50* (2006.01)
*C04B 35/515* (2006.01)
*B28B 3/00* (2006.01)

(52) U.S. Cl.
CPC ........ *C04B 35/553* (2013.01); *C04B 35/5156* (2013.01); *B28B 3/00* (2013.01); *C04B 2235/445* (2013.01); *C04B 2235/781* (2013.01); *C04B 2235/9653* (2013.01)

(58) Field of Classification Search
CPC .......................... C04B 35/553; C04B 35/5156
See application file for complete search history.

(56) References Cited

U.S. PATENT DOCUMENTS

| | | | |
|---|---|---|---|
| 8,236,200 B2 | 8/2012 | Sweeney et al. | |
| 8,445,822 B2* | 5/2013 | Sunne | F41G 7/2213 244/3.1 |
| 9,012,823 B2* | 4/2015 | Sunne | F42B 15/01 244/3.1 |
| 2012/0257290 A1* | 10/2012 | Ishizawa | C04B 35/6263 359/793 |
| 2014/0239228 A1* | 8/2014 | Ishizawa | C01F 11/22 252/301.4 S |
| 2016/0082282 A1* | 3/2016 | Kumada | A61N 5/10 252/478 |
| 2018/0341047 A1 | 11/2018 | Korenstein et al. | |

* cited by examiner

*Primary Examiner* — Karl E Group
(74) *Attorney, Agent, or Firm* — Lando & Anastasi, LLP

(57) ABSTRACT

Fluoride-based nanocomposite materials, optical articles made therefrom, and methods of making the fluoride-nanocomposite materials and optical articles. In certain examples, a fluoride-based nanocomposite material includes two or more interspersed fluoride-based nanograin materials with grains having one, two, or three dimensions that are less than 1 micrometer.

18 Claims, 8 Drawing Sheets

FLUORIDE-BASED NANOCOMPOSITE MATERIALS FOR INFRARED WINDOW APPLICATIONS

BACKGROUND

Commercial and military systems often have applications that use optical elements that are subjected to harsh environments. For example, airborne optical imaging systems may use a protective element such as a window or dome that is mounted on an exterior portion of the aircraft to isolate optics and other fragile components of the imaging system from the external environment through which the aircraft is flown. These dome or window elements must be transmissive in the spectral range (such as the infrared spectrum) used in the particular application, have a high degree of resistance to environmental exposures, and have sufficient strength to protect the remaining components of the imaging system during operation.

Conventional materials for windows and domes include single crystal sapphire (alpha aluminum oxide) and aluminum oxynitride (ALON). These materials have a very high degree of strength and a relatively high degree of infrared transparency, particularly over the wavelength range of about 2 micrometers (μm) to about 5 μm. While single crystal sapphire is material of choice in terms of its infrared transparency and hardness, windows made from sapphire are expensive and difficult to fabricate. Sapphire emits radiation at higher temperatures, which is undesirable due to the resulting increase in thermal noise seen by the detector in thermal imaging applications. In addition, sapphire exhibits significantly lower strength as temperature increases, especially above 600° C., which limits its use in hypersonic applications.

More recently, some oxide-based nanocomposite materials, made up of a matrix material containing particles of a nano-dispersoid, have been proposed for optical window and dome applications. For example, a matrix material that can be used for infrared window applications is spinel ($MgAl_2O_4$), which has a cubic crystalline structure, high strength, and may be formed into transparent structures. Other oxides can also be used. To strengthen the matrix, as may be required for high impact applications, nano-dispersoid particles that are harder than the matric material can be incorporated to form the nanocomposite material. For mid-wave infrared window applications, the nano-dispersoid particles should be made from a material that is transparent in the infrared spectral range of interest, preferably resistant to oxidation and water, and chemically compatible with the matrix material. Some examples of materials that can be used to make these particles include cubic-boron nitride (c-BN), silicon nitride ($Si_3N_4$), silicon carbide (SiC), or a combination of these materials.

SUMMARY OF INVENTION

Aspects and embodiments are directed to fluoride-based nanocomposite materials and optical articles made therefrom, and methods for forming the fluoride-based nanocomposite materials and articles.

According to one embodiment, a fluoride-based nanocomposite material comprises a first solid fluoride-based nanograin compound, and a second solid fluoride-based nanograin compound interspersed with the first fluoride-based nanograin compound, each of the first and second solid fluoride-based nanograin compounds having a grain size that is less than 1 micrometer in at least one dimension.

In one example at least one of the first and second fluoride-based nanograin compounds is a metal fluoride. In another example at least one of first and second fluoride-based nanograin compounds is a rare earth metal fluoride.

In one example the first fluoride-based nanograin compound is Strontium Fluoride and the second fluoride-based nanograin compound is Lanthanum Fluoride, and the fluoride-based nanocomposite material comprises between 70% an 95% Lanthanum Fluoride by weight. In another example the first fluoride-based nanograin compound is Strontium Fluoride and the second fluoride-based nanograin compound is Yttrium Fluoride, and the fluoride-based nanocomposite material comprises between 45% an 70% Yttrium Fluoride by weight. In another example the first fluoride-based nanograin compound is Barium Fluoride and the second fluoride-based nanograin compound is Lanthanum Fluoride, and the fluoride-based nanocomposite material comprises between 50% an 90% Lanthanum Fluoride by weight.

In one example the grain size of each of the first and second solid fluoride-based nanograin compounds is less than 100 nanometers in diameter.

In one example the first and second fluoride-based nanograin compounds are not soluble in water.

Another embodiment is directed to an optical window made from a fluoride-based nanocomposite material, the optical window being optically transmissive in at least a portion of the infrared spectrum, the fluoride-based nanocomposite material including two interspersed solid fluoride-based nanograin compounds each having a grain size that is less than 1 micrometer in at least one dimension.

In one example the optical window is optically transmissive over at least a portion of the visible spectrum. In another example the optical window is optically transmissive over at least a portion of the mid-wave infrared spectral band and at least a portion of the long-wave infrared spectral band.

In one example at least one of the two fluoride-based nanograin compounds is a metal fluoride. In another example at least one of the two fluoride-based nanograin compounds is a rare earth metal fluoride.

In one example one of the two fluoride-based nanograin compounds is Strontium Fluoride and the other of the two fluoride-based nanograin compounds is Lanthanum Fluoride, and the fluoride-based nanocomposite material comprises between 70% an 95% Lanthanum Fluoride by weight. In another example one of the two fluoride-based nanograin compounds is Strontium Fluoride and the other of the two fluoride-based nanograin compounds is Yttrium Fluoride, and the fluoride-based nanocomposite material comprises between 45% an 70% Yttrium Fluoride by weight. In another example one of the two fluoride-based nanograin compounds is Barium Fluoride and the other of the two fluoride-based nanograin compounds is Lanthanum Fluoride, and the fluoride-based nanocomposite material comprises between 50% an 90% Lanthanum Fluoride by weight.

In one example the grain size of each of the two fluoride-based nanograin compounds is less than 100 nanometers in diameter.

In one example the two fluoride-based nanograin compounds are not soluble in water.

According to one embodiment, a method of making a fluoride-based nanocomposite material includes selecting first and second fluoride-based compounds, forming a fluoride-based nanocomposite powder including the first and second fluoride-based compounds mixed and interspersed with one another in a predetermined ratio by weight, and processing the fluoride-based nanocomposite powder to form the fluoride-based nanocomposite material wherein a grain size of powder particles of the fluoride-based nanocomposite material is less than 1 micrometer in at least one dimension.

In one example selecting the first and second fluoride-based compounds includes selecting first and second fluoride powders. In one example forming the fluoride-based nanocomposite powder includes mixing the first and second fluoride powders together. In one example selecting the first and second fluoride-based compounds includes selecting Strontium Fluoride and Lanthanum Fluoride, and wherein mixing the first and second fluoride powders together in the predetermined ratio includes mixing the Strontium Fluoride and Lanthanum Fluoride to form the fluoride-based nanocomposite material having between 70% an 95% Lanthanum Fluoride by weight. In another example selecting the first and second fluoride-based compounds includes selecting Strontium Fluoride and Yttrium Fluoride, and wherein mixing the first and second fluoride powders together in the predetermined ratio includes mixing the Strontium Fluoride and Yttrium Fluoride to form the fluoride-based nanocomposite material having between 45% an 70% Yttrium Fluoride by weight. In another example selecting the first and second fluoride-based compounds includes selecting Barium Fluoride and Lanthanum Fluoride, and wherein mixing the first and second fluoride powders together in the predetermined ratio includes mixing Barium Fluoride and Lanthanum Fluoride to form the fluoride-based nanocomposite material having between 50% an 90% Lanthanum Fluoride by weight.

In one example processing the fluoride-based nanocomposite powder includes processing the fluoride-based nanocomposite powder to reduce the grain size of the powder particles. In one example processing the fluoride-based nanocomposite powder includes processing the fluoride-based nanocomposite powder to reduce the grain size of the powder particles to less than 100 nanometers in diameter. In one example processing the fluoride-based nanocomposite powder includes grinding or milling the powder.

In one example selecting the first and second fluoride-based compounds includes selecting at least one metal fluoride compound. In another example selecting the first and second fluoride-based compounds includes selecting at least one rare earth metal fluoride compound.

In one example selecting the first and second fluoride-based compounds includes selecting first and second soluble salts having non-fluoride components corresponding to non-fluoride components of the first and second fluoride-based compounds. In one example forming the nanocomposite powder includes mixing the first and second soluble salts in solution with the predetermined ratio by weight, adding a fluoride source to the solution, and precipitating the fluoride-based nanocomposite powder out of the solution. In one example, processing the fluoride-based nanocomposite powder includes washing and drying the fluoride-based nanocomposite powder.

According to another embodiment, a method of making an optical component includes forming a fluoride-based nanocomposite powder material, filling a mold with the fluoride-based nanocomposite powder material, the mold having a shape corresponding to a shape of the optical component, processing the fluoride-based nanocomposite powder material in the mold, and extracting the optical component from the mold. The fluoride-based nanocomposite powder material may be made according to examples of the methods discussed above and further below. The optical component may be an optical window, for example.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Certain optical applications, including guidance systems, transmit and/or receive electromagnetic radiation in at least a portion of the infrared (IR) region of the electromagnetic spectrum, and optionally also in at least a portion of the visible region of the electromagnetic spectrum. Protective elements used in these systems, such as domes and windows (collectively referred to herein as optical windows), must therefore be transmissive in the IR spectral band and also function to protect the optical components of the system. Ideally, these protective elements are highly impact resistant and capable of withstanding water droplet (e.g., rain) and sand impact and provide thermal shock resistance, especially at hypersonic speeds.

As discussed above, some oxide-based nanocomposite materials have been used for optical window applications. In addition to oxide-based nanocomposite materials, sulfide-based nanocomposites can be fabricated and used for certain optical applications. For example, sulfide-based nanocomposite materials may generally consist of two different metal sulfides, such as zinc sulfide (ZnS) and calcium lanthanum sulfide ($CaLa_2S_4$, also referred to as CLS). However, sulfide-based nanocomposites are susceptible to moisture, which results in poor IR transmittance in the mid-wave infrared (MWIR; approximately 3-8 μm) and long-wave infrared (LWIR; approximately 8-15 μm) spectral bands. For example, deep absorption bands are observed both in the MWIR and LWIR spectral bands, as shown in FIGS. 1 and 2.

Figure 1:
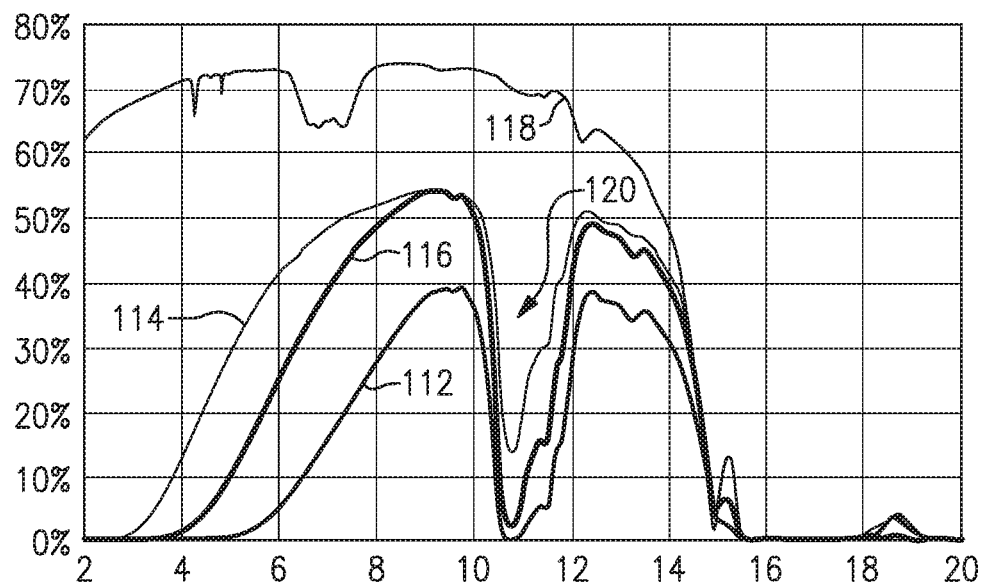
FIG. 1 is a graph showing transmittance spectra of various materials.
Figure 2:
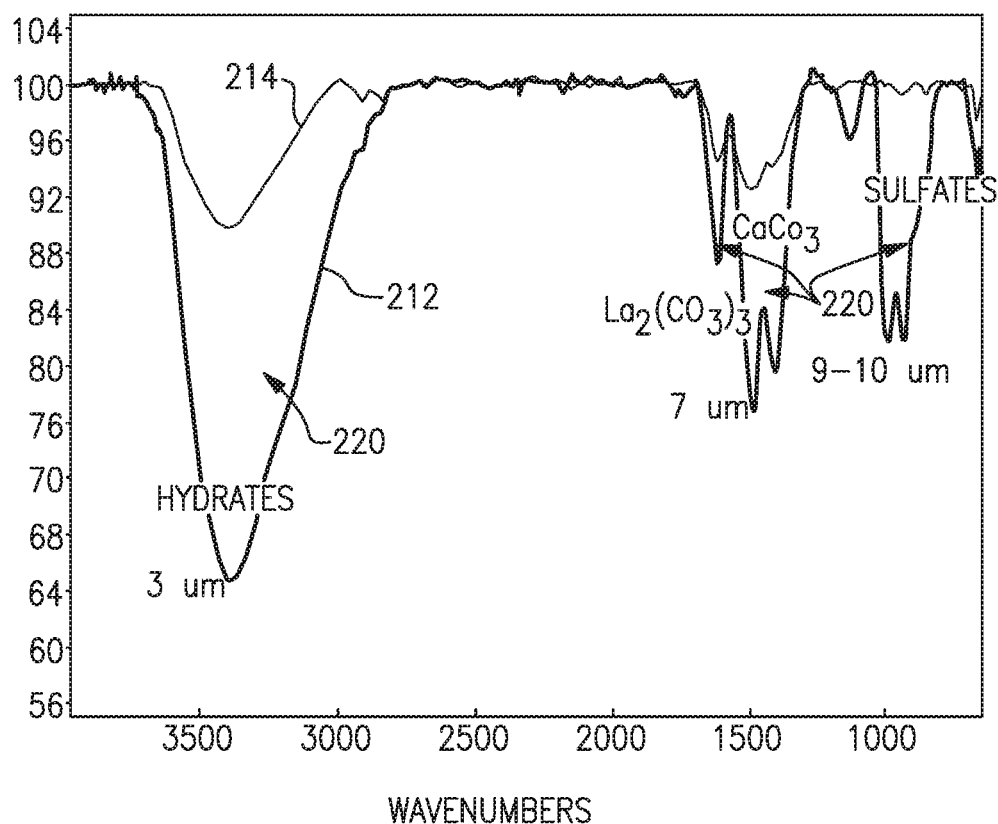
FIG. 2 is a graph of transmittance spectra of a ZnS:CLS nanocomposite powder, showing absorption bands due to the presence of hydrates, carbonates and sulfates.

FIG. 1 is a graph showing transmittance spectra of three ZnS:CLS nanocomposites (curves 112, 114, and 116) as well as pure ZnS (curve 118). Deep absorption bands 120 are seen for all three ZnS:CLS nanocomposites in the wavelength range between 10 and 12 μm, which corresponds to a portion of the LWIR spectral band. These absorptions 120 are attributed to the presence of sulfate and/or oxysulfide impurities, which are formed by the reaction of moisture with the nano-sulfide powders. Although Calcium and Lanthanum are believed to be the source of these impurities, most other metal sulfides are also susceptible to moisture. Attempts to prevent powder contamination have not been successful. The sulfate and oxysulfide impurities can be removed from the ZnS:CLS nanocomposite powders by treatment at elevated temperatures with hydrogen sulfide ($H_2S$) in a furnace. FIG. 2 is a graph of transmittance spectra of ZnS:CLS nanocomposite powder, showing absorption bands 220 due to the presence of hydrates, carbonates and sulfates. Curve 212 corresponds to "starting-point" or untreated ZnS:CLS powder. Curve 214 corresponds to the ZnS:CLS powder after an annealing process with $H_2S/N_2$ at 600° C. As can be seen in FIG. 2, the absorption bands 220 are greatly reduced for curve 214 relative to curve 212. However, as soon as the powders are removed from the furnace, they again begin to react with the moisture in the atmosphere. In addition, further powder processing steps, such as batching, milling and screening, for example, which may be needed to process the nanocomposite powder into a final article, such as an optical window, necessarily expose the cleaned powders to moisture, negating the effects of the anneal.

Accordingly, there is a need for a nanocomposite material that has good optical properties, such as high transmittance in the infrared spectrum, is sufficiently hard to be highly impact resistant so as to provide good protection to optical and electronic components of the system in which it is used, and is resistant to performance degradation caused by exposure to moisture. Unlike metal sulfides, such as ZnS and CLS discussed above, some metal fluorides are not susceptible to reactions with water. Accordingly, nanocomposites made from these metal fluorides also will not be susceptible to contamination by impurities caused by exposure to moisture.

Aspects and embodiments are directed to nanocomposite materials made of at least two different fluorides, at least one of which is a metal fluoride, and to articles such as optical windows fabricated from these materials. The fluoride-based nanocomposite material is a multi-phase solid material, meaning that it includes at least two fluoride-based compounds (phases) interspersed with one another (e.g., particles or grains of one fluoride-based compound are dispersed in amongst the particles or grains of the other fluoride-based compound, but both compounds remain distinct; one is not dissolved in the other). There are several key factors to consider in selecting the fluorides to form a nanocomposite material according to various embodiments. For example, it is important to select fluorides that are not susceptible to moisture. Advantageously, metal fluorides tend not to be soluble in water, and have good optical transmission properties. Some examples of suitable fluorides include Strontium Fluoride ($SrF_2$), Lanthanum Fluoride ($LaF_3$), Yttrium Fluoride ($YF_3$), Calcium Fluoride ($CaF_2$), and Barium Fluoride ($BaF_2$). In addition, the fluorides must remain as separate phases with limited solid solubility in each other in order to form a nanocomposite. There are two phase regions for most fluorides in Group 2 of the periodic table (alkaline earth fluorides). Further, it is desirable that the fluorides can be readily prepared as nano-powders. Certain embodiments are directed to fluoride-based nanocomposite materials for infrared optical window applications. In such embodiments, the fluorides selected to form the nanocomposite materials have high optical transmittance in at least the MWIR and LWIR spectral bands. In addition, it is desirable for certain applications, such as optical window applications, that the nanocomposite material exhibit sufficient strength and hardness to endure the stresses of a harsh environment, as may be encountered in airborne infrared imaging or guidance systems. For example, $CaF_2$ is hard, and therefore a nanocomposite made from $CaF_2$ and another metal fluoride may exhibit favorable hardness properties for applications such as optical windows. In general, the harder the individual fluoride components of the nanocomposite, the higher the likelihood that the end-product nanocomposite material will be hard. In certain instances there may be trade-off between optical transmission properties and hardness.

Figure 3:
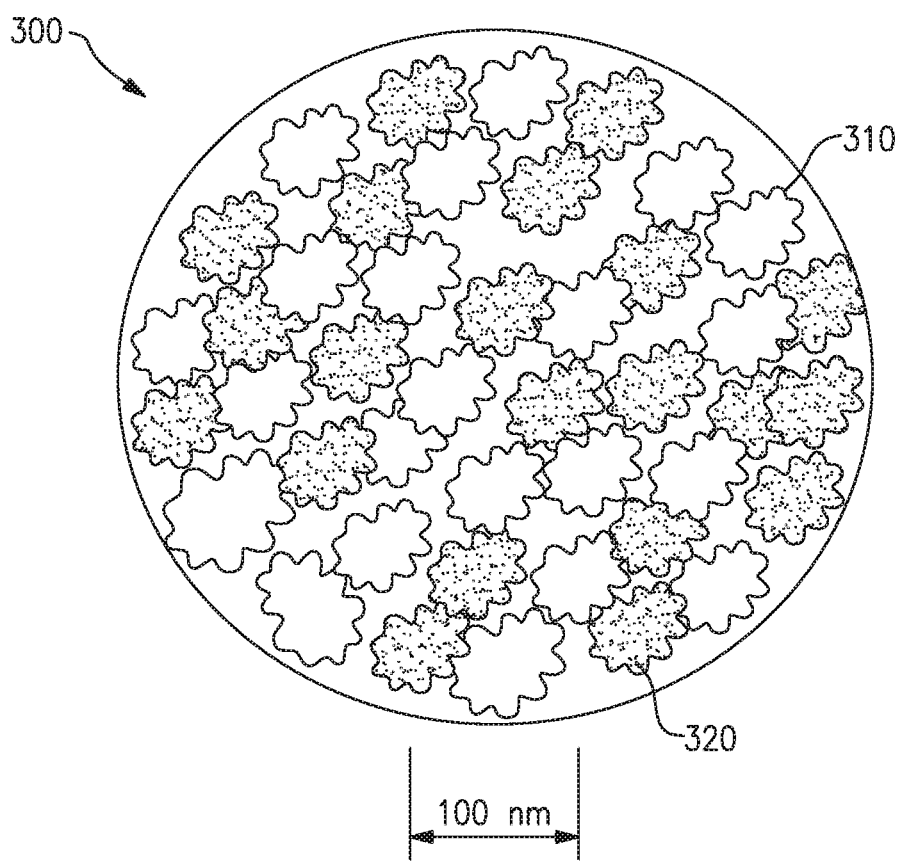
FIG. 3 is a diagram illustrating a portion of an example of a nanocomposite material.

As used herein, the term nanocomposite is intended to refer to a multi-phase solid material, as discussed above, in which the particles (also referred to as grains) of at least one of the phases have one, two, or three dimensions of less than one μm. In certain examples, the size of the particles of one or both phases are controlled to remain well below the lowest transmission wavelength of interest to minimize interference scattering. According to one embodiment, the particles of both phases may be less than 100 nm in diameter on average, which may allow for good optical, thermal, and mechanical properties. Thus, a fluoride-based nanocomposite material according to aspects and embodiments disclosed herein comprises at least first and second solid fluoride-based nanograin compounds (i.e., fluoride-based compounds, particles or grains of which have one, two, or three dimensions of less than one μm as discussed above) interspersed with one another. FIG. 3 is a diagram showing a portion of an example of a fluoride-based nanocomposite material 300 that includes a first fluoride-based nanograin compound 310 (white grains shown in FIG. 3) and a second fluoride-based nanograin compound 320 (dark grains in FIG. 3). In this example, the grains of both fluoride-based nanograin compounds 310, 320 have at least two dimensions (or a diameter) on the order of 100 nm, as shown.

Figure 4:
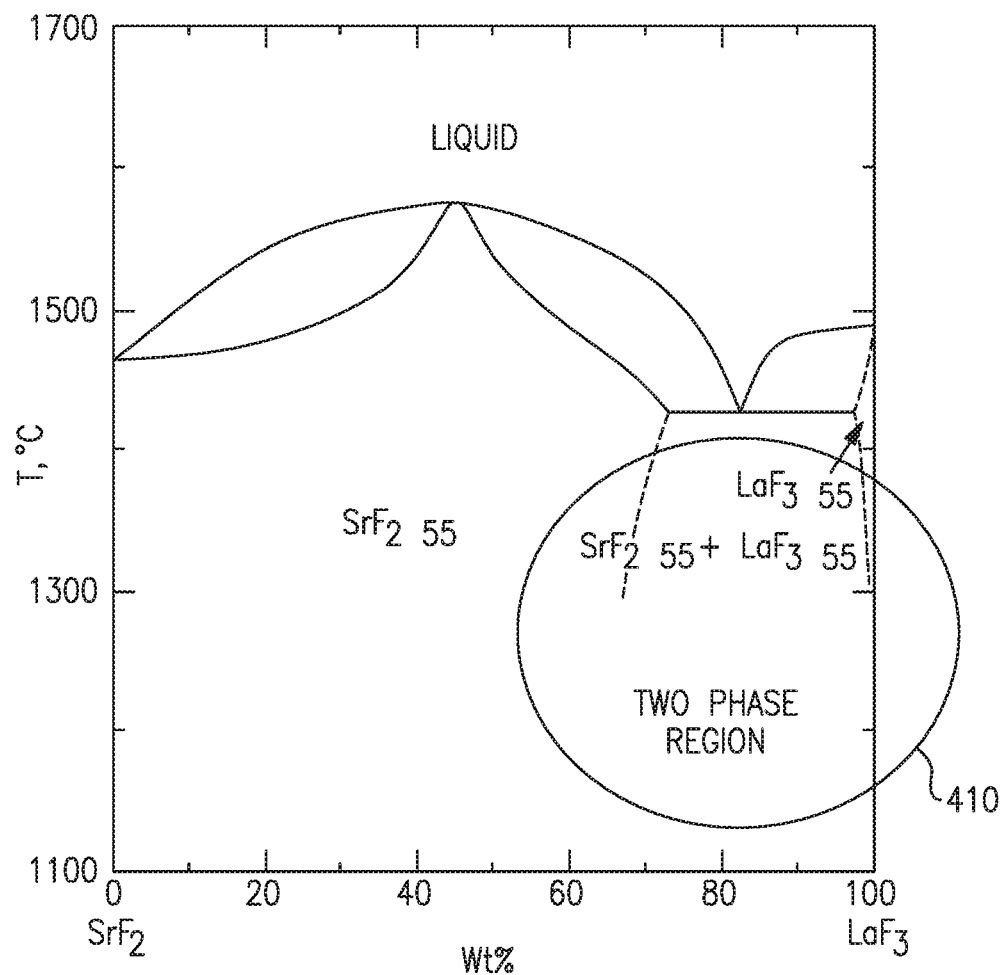
FIG. 4 is a phase diagram for combinations of Strontium Fluoride and Lanthanum Fluoride.

Certain embodiments are directed to a fluoride-based nanocomposite material made from a combination of $SrF_2$ and $LaF_3$. The fluorides $SrF_2$ and $LaF_3$ are not soluble in water and are optically transmissive in the MWIR and LWIR spectral bands. In addition, as shown in FIG. 4, phase diagram data indicates that a nanocomposite can be formed when a mixture of the two compounds includes between 70% and 95% $LaF_3$ by weight (the two phase insoluble region is indicated at 410).

Further embodiments are directed to a fluoride-based nanocomposite material made from a combination of $SrF_2$ and $YF_3$. $YF_3$ is also not soluble in water and is optically transmissive in the MWIR and LWIR spectral bands. Phase diagram data indicates that a nanocomposite can be formed when a mixture of the two compounds includes between 40% and 75% $YF_3$ by weight.

Figure 5:
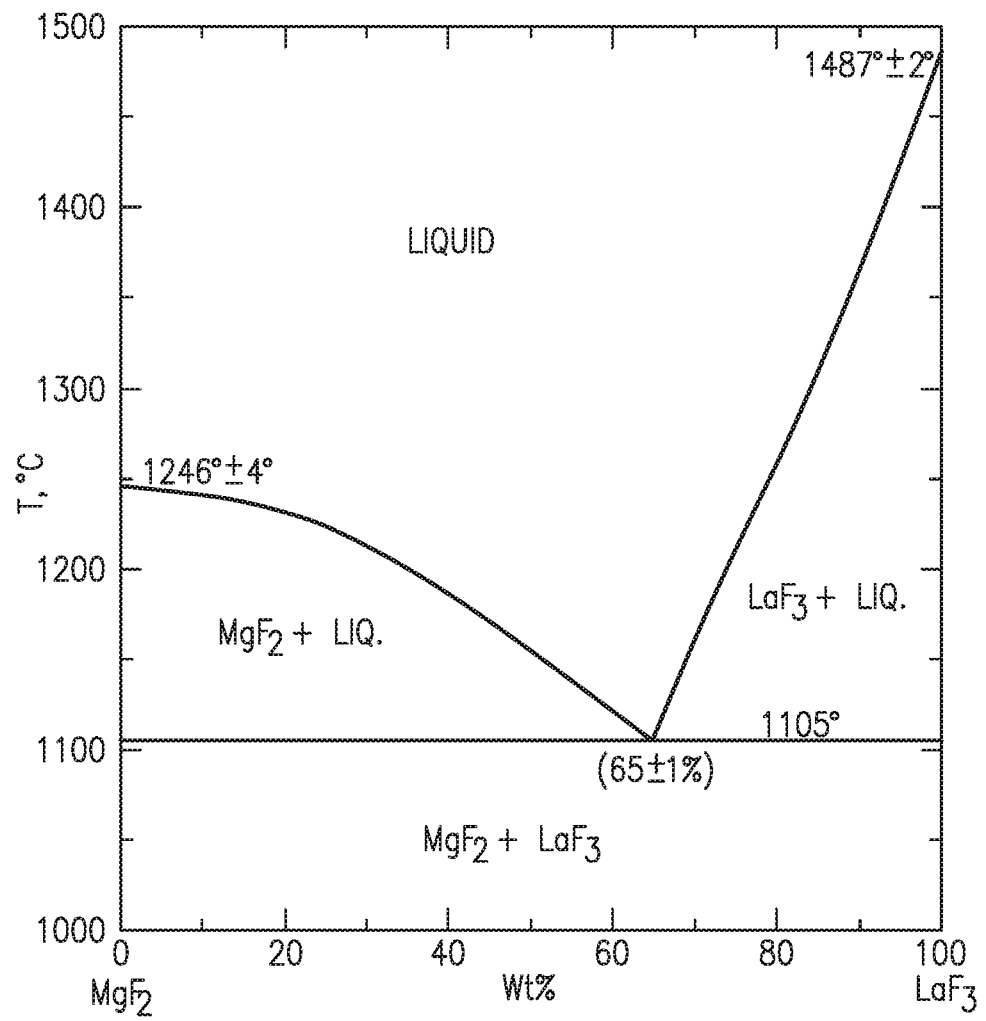
FIG. 5 is a phase diagram for combinations of Magnesium Fluoride and Lanthanum Fluoride.
Figure 6:
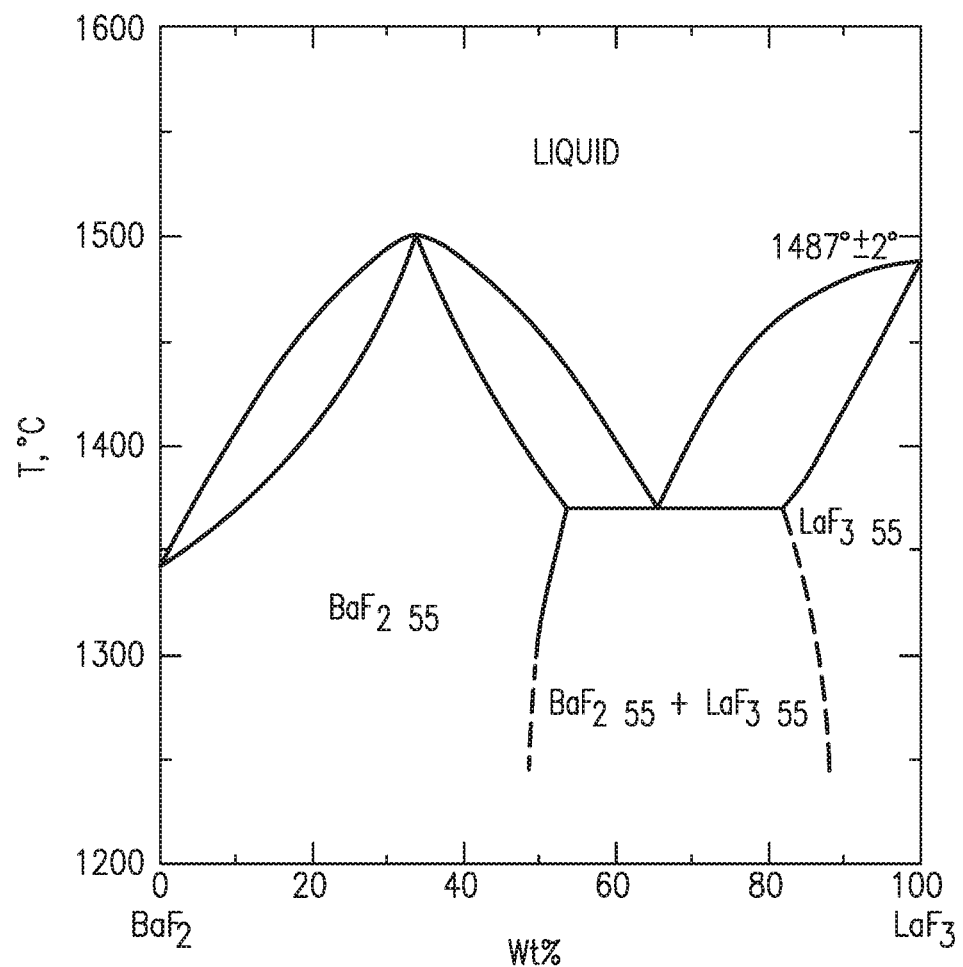
FIG. 6 is a phase diagram for combinations of Barium Fluoride and Lanthanum Fluoride.

Additional embodiments are directed to fluoride-based nanocomposite materials made from combinations of Magnesium Fluoride ($MgF_2$) and $LaF_3$, and $BaF_2$ and $LaF_3$. Phase diagram data indicating that a nanocomposite can be formed from a mixture of $MgF_2$ and $LaF_3$ is shown in FIG. 5. FIG. 6 illustrates phase diagram data supporting formation of a nanocomposite from a mixture of $BaF_2$ and $LaF_3$. As shown in FIG. 6, the two phase insoluble region for these two compounds exists for a mixture having between 50% and 90% $LaF_3$ by weight.

Thus, fluoride-based nanocomposite materials can be formed from a variety of fluoride combinations, in particular, combinations including metal fluorides or rare earth metal fluorides. As discussed above, unlike sulfide-based nanocomposites, these fluoride-based nanocomposites may not be susceptible to moisture, and therefore may be more suitable for certain applications, including optical windows. In addition, unlike the sulfides, the synthesis of fluoride nano-powders is relatively straightforward. For example, as discussed further below, the fluorides can be synthesized via aqueous precipitation. In contrast, of the sulfides of interest for most imaging applications, only ZnS can be made via aqueous precipitation. Thus, by using fluorides, there is no need for complicated and expensive flame pyrolysis equipment that is required for the formation of most sulfide nano-powders.

Figure 7:
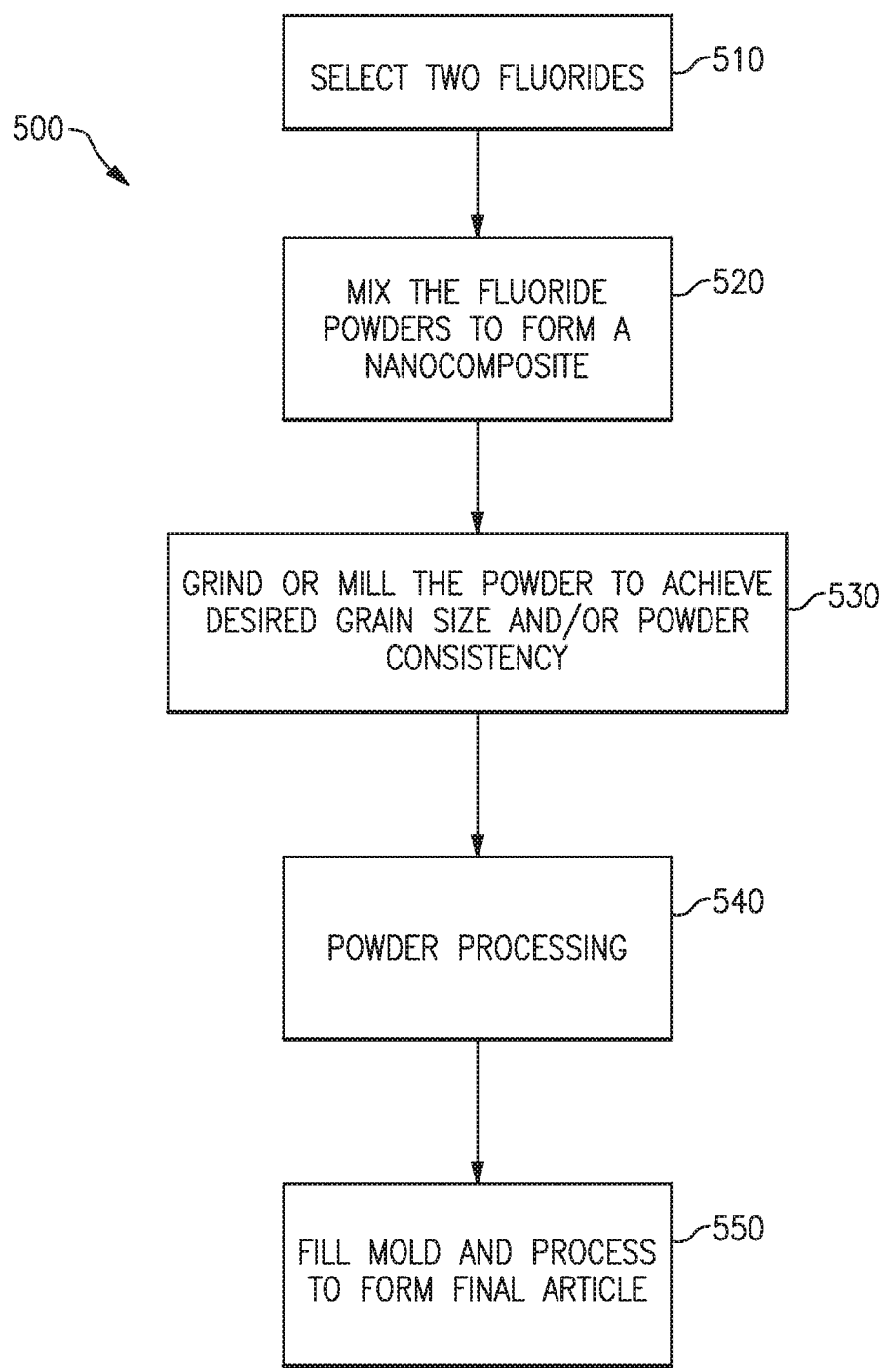
FIG. 7 is a flow diagram of one example of a method of making a fluoride-based nanocomposite material and an article made from the fluoride-based nanocomposite material.

Referring to FIG. 7, there is illustrated a flow diagram of one example of a method of forming a fluoride-based nanocomposite material, and an object made from the nanocomposite material, according to certain embodiments. At step 510, the at least two fluoride compounds that will be used to form the nanocomposite material are selected. As discussed above, in certain examples, the at least two selected fluorides are optically transmissive in at least a portion of the infrared spectrum (e.g., at least part of the MWIR and LWIR spectral bands), are not soluble in water, and have a phase region where they are not soluble in each other such that they can be formed into a nanocomposite material. In certain examples at least one of the selected fluorides is a metal fluoride. In some examples at least one of the two selected fluorides is a rare earth metal fluoride. Examples of fluorides that may be selected in step 510 include, but are not limited to, $SrF_2$, $LaF_3$, $YF_3$, $CaF_2$, $MgF_2$, and $BaF_2$. In other examples, any rare earth metal fluoride may be selected. Examples of combinations of selected fluorides include, but are not limited to, $SrF_2$:$YF_3$, $MgF_2$:$LaF_3$, $BaF_2$:$LaF_3$, $CaF_2$:$LaF_3$, and $SrF_2$:$LaF_3$.

In certain instances, the selected fluorides may be commercially or otherwise readily available as powders that can be processed and mixed to form the nanocomposite material. In this case, the process 500 includes a step 520 of mixing the two selected fluoride powders with a correct ratio by weight to form a nanocomposite powder. In other instances, instead of step 520, the process 500 includes forming the fluoride powder from base materials.

Figure 8:
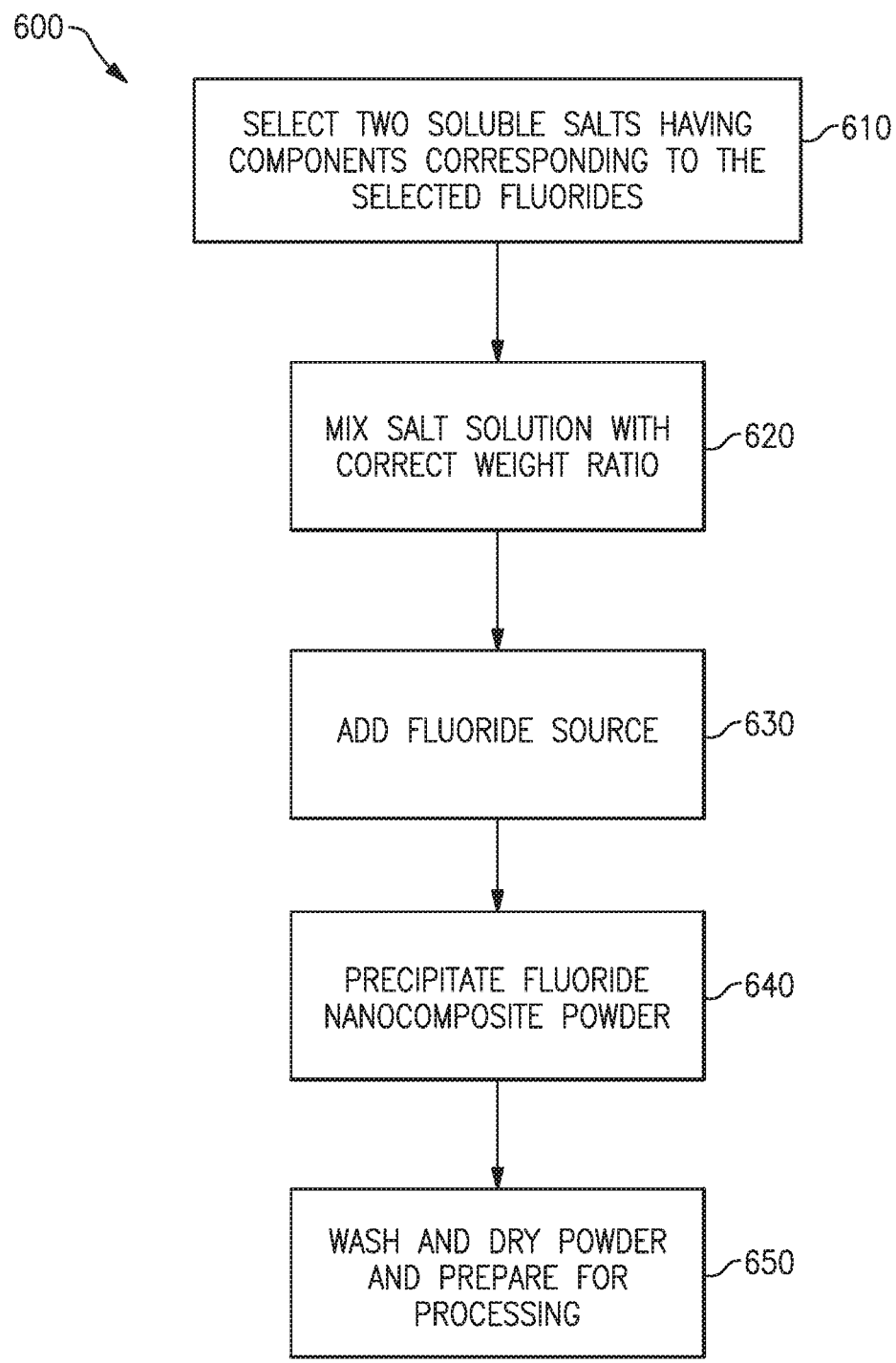
FIG. 8 is a flow diagram of one example of method of making a fluoride-based nanocomposite powder.

Referring to FIG. 8 there is illustrated a flow diagram of one example of a method of forming a fluoride-based nanocomposite material via a process of aqueous precipitation. In certain examples the process 600 can replace step 520 in the process 500 of FIG. 7. At step 610, two salts are selected corresponding to the two fluorides selected in step 510. For example, if it is desired to make a $CaF_2$:$LaF_3$ nanocomposite material, fluorides $CaF_2$ and $LaF_3$ would be selected in step 510. Accordingly, step 610 would include selecting a Calcium salt and a Lanthanum salt. For example, these salts may include Calcium Nitrate and Lanthanum Nitrate.

At step 620, the two selected salts are mixed together in an aqueous solution. The salts may be mixed with a weight ratio corresponding to the phase ratio (by weight) of the fluoride compounds needed to form the nanocomposite material. For example, as discussed above, a nanocomposite material can be formed from a mixture of $SrF_2$ and $LaF_3$ having between 70% and 95% $LaF_3$ by weight. Accordingly, to form an example of this nanocomposite material, in step 620 a Strontium salt and a Lanthanum salt may be mixed in solution with the salt mixture including 70%-95% Lanthanum salt (and therefore correspondingly 5%-30% Strontium salt).

In step 630, a source of fluoride is added to the solution. For example, the source of fluoride may include ammonium fluoride or another soluble fluoride that can react with the salts in the solution to form the desired fluoride compounds (e.g., $SrF_2$, $LaF_3$, $CaF_2$, etc.).

In step 640 the resulting fluoride nanocomposite powder is precipitated out of the solution.

The fluoride nanocomposite powder may then be washed to remove any remnants of the starting materials, any remaining water can be removed/discarded, and the fluoride nanocomposite powder can be dried to prepare for further processing (step 650) in process 500.

Returning to FIG. 7, once the fluoride-based nanocomposite powder is obtained, it may be ground or milled in step 530 to achieve a desired grain size and/or powder consistency. As discussed above, in certain instances, fluoride compounds may be commercially available in powder form; however, these powders may have grain sizes that in the micrometer range rather than the nanometer range desired to form the nanocomposite material. Smaller grain size may produce a harder nanocomposite material, and it may therefore be desirable to make the powder particles as small as possible. Accordingly, in step 530 the powder mixture formed in step 520 may be milled or ground, using a tool or bit made of a material that is harder than the fluoride-based compounds, to reduce the grain size of the powder to the desired dimensions. In other examples, the fluoride powders selected in step 510 may be milled or ground to reduce the grain size prior to being mixed together in step 520. In examples in which the fluoride-based nanocomposite powder is formed using an embodiment of the process 600, the precipitated powder may already have grain sizes in the nanometer range. However, the powder particles may stick together or agglomerate. Accordingly, the powder may be milled, ground, or otherwise "processed in step 530 to break up any large clumps of particles and achieve a powder having a desired consistency for further processing. In addition, even though the precipitated powder may have nanometer-scale grain sizes, the powder may nevertheless be milled or ground in step 530 to reduce the grain size even further, for example, to increase the hardness of the nanocomposite material.

Step 540 may include various powder processing acts, which may depend on the fluoride-based compounds selected and/or the characteristics required for the final nanocomposite material and/or article(s) to be made from the nanocomposite material. For example, the powder may pressed and/or processed using thermal cycling. In certain examples, one or more binder materials may be added to hold the powder together. The binder materials are generally organic materials. In some instances, unlike typical oxide-based or sulfide-based materials, the fluoride-based nanocomposite material may not require additives such as binders. Steps 530 and 540 may be performed separately (either in the order shown in FIG. 7 or the reverse order) or together. For example, in some instances, a surfactant or dispersive may be added to the powder during step 530 to better get the particles into dispersion.

In step 550 the fluoride-based nanocomposite material formed by the preceding steps (and optionally process 600) can be molded into a selected shape and structure to form an article, such as an optical window, for example. This may include filling a mold corresponding to the article with the powder, processing it (e.g., pressing, heating, curing, and/or other steps known to those skilled in the art as may be used to produce an article from a molded powder), and finally extracting the formed article from the mold.

Thus, aspects and embodiments provide various fluoride-based nanocomposite materials and articles made therefrom, and methods for forming the fluoride-based nanocomposite materials and articles.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A fluoride-based nanocomposite material comprising:
a first solid fluoride-based nanograin compound; and
a second solid fluoride-based nanograin compound interspersed with the first fluoride-based nanograin compound, each of the first and second solid fluoride-based nanograin compounds having a grain size that is less than 1 micrometer in at least one dimension.

2. The fluoride-based nanocomposite material of claim 1 wherein at least one of the first and second fluoride-based nanograin compounds is a metal fluoride.

3. The fluoride-based nanocomposite material of claim 2 wherein at least one of first and second fluoride-based nanograin compounds is a rare earth metal fluoride.

4. The fluoride-based nanocomposite material of claim 1 wherein the first fluoride-based nanograin compound is Strontium Fluoride and the second fluoride-based nanograin compound is Lanthanum Fluoride, and the fluoride-based nanocomposite material comprises between 70% an 95% Lanthanum Fluoride by weight.

5. The fluoride-based nanocomposite material of claim 1 wherein the first fluoride-based nanograin compound is Strontium Fluoride and the second fluoride-based nanograin compound is Yttrium Fluoride, and the fluoride-based nanocomposite material comprises between 45% an 70% Yttrium Fluoride by weight.

6. The fluoride-based nanocomposite material of claim 1 wherein the first fluoride-based nanograin compound is Barium Fluoride and the second fluoride-based nanograin compound is Lanthanum Fluoride, and the fluoride-based nanocomposite material comprises between 50% an 90% Lanthanum Fluoride by weight.

7. The fluoride-based nanocomposite material of claim 1 wherein the grain size of each of the first and second solid fluoride-based nanograin compounds is less than 100 nanometers in diameter.

8. The fluoride-based nanocomposite material of claim 1 wherein the first and second fluoride-based nanograin compounds are not soluble in water.

9. An optical window made from a fluoride-based nanocomposite material, the optical window being optically transmissive in at least a portion of the infrared spectrum, the fluoride-based nanocomposite material including two interspersed solid fluoride-based nanograin compounds each having a grain size that is less than 1 micrometer in at least one dimension.

10. The optical window of claim 9 wherein the optical window is optically transmissive over at least a portion of the visible spectrum.

11. The optical window of claim 9 wherein the optical window is optically transmissive over at least a portion of the mid-wave infrared spectral band and at least a portion of the long-wave infrared spectral band.

12. The optical window of claim 9 wherein at least one of the two fluoride-based nanograin compounds is a metal fluoride.

13. The optical window of claim 12 wherein at least one of the two fluoride-based nanograin compounds is a rare earth metal fluoride.

14. The optical window of claim 9 wherein one of the two fluoride-based nanograin compounds is Strontium Fluoride and the other of the two fluoride-based nanograin compounds is Lanthanum Fluoride, and the fluoride-based nanocomposite material comprises between 70% an 95% Lanthanum Fluoride by weight.

15. The optical window of claim 9 wherein one of the two fluoride-based nanograin compounds is Strontium Fluoride and the other of the two fluoride-based nanograin compounds is Yttrium Fluoride, and the fluoride-based nanocomposite material comprises between 45% an 70% Yttrium Fluoride by weight.

16. The optical window of claim 9 wherein one of the two fluoride-based nanograin compounds is Barium Fluoride and the other of the two fluoride-based nanograin compounds is Lanthanum Fluoride, and the fluoride-based nanocomposite material comprises between 50% an 90% Lanthanum Fluoride by weight.

17. The optical window of claim 9 wherein the grain size of each of the two fluoride-based nanograin compounds is less than 100 nanometers in diameter.

18. The optical window of claim 9 wherein the two fluoride-based nanograin compounds are not soluble in water.

* * * * *